United States Patent [19]
Yurick

[11] 3,742,333
[45] June 26, 1973

[54] D-C VOLTAGE CONTROL WITH ADJUSTABLE PULSE WIDTH AND REPETITION RATE

[75] Inventor: John J. Yurick, Fountain Valley, Calif.

[73] Assignee: International Rectifier Corporation, Los Angeles, Calif.

[22] Filed: May 13, 1971

[21] Appl. No.: 143,111

[52] U.S. Cl. .............................. 321/45 C, 318/227
[51] Int. Cl. .................................. H02m 3/32
[58] Field of Search .................. 323/DIG. 1; 321/45 C; 318/227, 230, 231, 341, 246

[56] References Cited
UNITED STATES PATENTS
| | | | |
|---|---|---|---|
| 3,663,942 | 5/1972 | Jakobsen | 321/45 C |
| 3,315,145 | 4/1967 | Menard | 321/45 C |
| 3,568,021 | 3/1971 | Turnbill | 321/45 C |

FOREIGN PATENTS OR APPLICATIONS
| | | | |
|---|---|---|---|
| 1,060,317 | 3/1967 | Great Britain | 321/45 C |
| 1,912,843 | 10/1970 | Germany | 321/45 C |
| 68,553 | 8/1969 | Germany | 321/45 C |
| 1,063,733 | 3/1967 | Great Britain | 321/45 C |

Primary Examiner—Gerald Goldberg
Attorney—Ostrolenk, Faber, Gerb & Soffen

[57] ABSTRACT

A d-c voltage control circuit provides a controlled rectifier in series with a motor and battery and provides gating pulses to fire the controlled rectifier at an adjustable pulse repetition rate. A turn-off circuit for turning off the controlled rectifier is adjustable independently of the pulse repetition rate adjustment to adjust the length of time the controlled rectifier conducts after firing.

2 Claims, 1 Drawing Figure

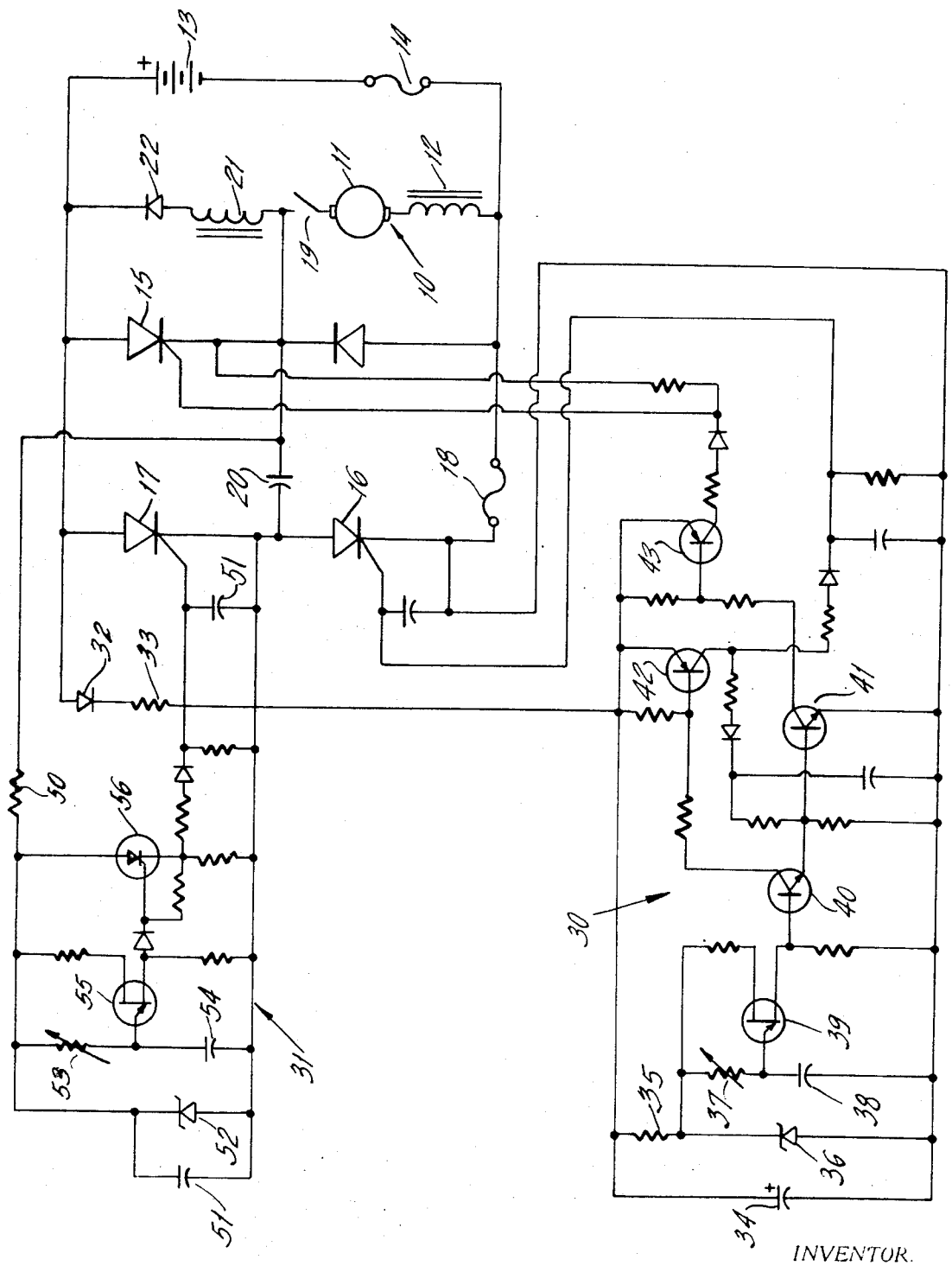
INVENTOR.
JOHN J. YURICK
BY
Ostrolenk, Faber, Gerb & Soffen
ATTORNEYS

D-C VOLTAGE CONTROL WITH ADJUSTABLE PULSE WIDTH AND REPETITION RATE

SUMMARY OF THE INVENTION

This invention relates to a solid state control circuit for d-c voltage operated vehicles, and more particularly relates to a control circuit which provides full range control with simple, low-cost circuitry.

Control circuits using controlled rectifiers to vary the speed of the d-c motor of battery-operated vehicles are well known. Thus, such circuits are in common use for battery-operated lift trucks, and the like. Such controls, however, have been expensive and complex and are not well suited to use with smaller electrical vehicles such as golf carts, small in-plant personnel carriers, and the like. The present invention provides a novel control circuit which provides full range control with simple low-cost circuitry. Thus, the control of the present invention can be used for the control of large d-c powered equipment, but also makes electric control economically feasible for smaller equipment as well.

The novel circuit of the invention provides high efficiency, increased reliability as a result of a reduced number of components, and operation by either or both a frequency control or pulse width control. Moreover, the control is made independent of motor characteristics.

The novel circuit provides two independent but synchronized timing circuits for gating and turning off the main controlled rectifier. A gating circuit logic is then provided which allows the power controlled rectifier to be controlled to full conduction, with the turn-off circuit being rendered inoperative at this adjustment.

BRIEF DESCRIPTION OF THE DRAWING

The drawing shows a circuit diagram of a preferred embodiment of the invention.

DETAILED DESCRIPTION OF THE PREFERRED EMBODIMENT

Referring to the drawing, there is shown a d-c motor 10 having an armature 11 and field winding 12 where motor 10 is to be energized from battery 13, through protective fuse 14. Clearly, any type d-c motor could be used, and battery 13 could be any type d-c source. A main controlled rectifier 15 is provided to permit energization of motor 10 from battery 13 so long as controlled rectifier 15 is conductive. The conduction of controlled rectifier 15 is controlled, in turn, by auxiliary controlled rectifiers 16 and 17.

Controlled rectifier 16 is gated at the same time as controlled rectifier 15, as will be later seen, and is connected in closed series with fuse 18, fuse 14, and capacitor 20. Controlled rectifier 17 operates to turn off controlled rectifier 15 upon firing of controlled rectifier 17.

An inductor 21 and diode 22 are provided to allow the circuit to operate with the motor 10 disconnected. Thus, motor 10 may be provided with a switch 19. When this switch is opened, the inductor 21 and diode 22 define a discharge path for capacitor 20, as will be later described.

Two timing control circuits 30 and 31 are then provided for controlling the pulse repetition rate and the on-to-off ratio, respectively, of controlled rectifier 15.

Control voltage for timing circuit 30 is obtained from battery 13 through diode 32 and resistor 33 and is applied to storage capacitor 34 and resistor 35. A reference voltage diode 36 provides a reference voltage to the timing circuit including adjustable resistor 37 and capacitor 38. The adjustment of resistor 37 will determine the rate at which capacitor 38 will charge, thereby regulating the discharge rate of unijunction transistor 39. The pulse current output of unijunction transistor 39 is amplified in the amplifier consisting of transistors 40, 41, 42 and 43. The output of transistor 43 is then connected in the gating circuit of controlled rectifier 15, while the output of transistor 42 is simultaneously applied to the gating circuit of controlled rectifier 16. Thus, timing circuit 30 will cause a gating signal to be applied to the gating circuits of controlled rectifiers 15 and 16 at a frequency controlled by the adjustment of adjustable resistor 37.

Timing control circuit 31, in accordance with an important feature of the invention, derives its operating voltage from capacitor 20 through resistor 50. Circuit 31 includes a capacitor 51 in parallel with reference diode 52 and a timing R-C circuit including adjustable resistor 53 and capacitor 54. The adjustment of resistor 53 determines the time at which unijunction transistor 55 will conduct a current pulse (following the charging of capacitor 20) for gating controlled rectifier 56. The output of controlled rectifier 56 is connected to the gate circuit of controlled rectifier 17 as shown. As will be later seen, the adjustment of resistor 53 determines the time at which controlled rectifier 17 fires to stop conduction of controlled rectifier 15, thereby to conduct the on-to-off ratio of controlled rectifier 15.

The operation of the circuit is as follows:

In order to vary the speed of d-c motor 10, and thus the load which it drives, controlled rectifier 15 is switched on and off at a controlled rate and for a controlled duration, thereby controlling the average voltage applied to motor 10.

Assume first that controlled rectifier 15 is nonconductive and the circuit to battery 13 is closed. Capacitor 38 of timing circuit 30 begins to charge until after a given time, determined by the values of adjustable resistor 37 and capacitor 38, transistor 39 discharges a pulse of current. This pulse is amplified by transistors 40, 41, 42 and 43 to apply current pulses to the gate circuits of controlled rectifiers 15 and 16. Both controlled rectifiers 15 and 16 become conductive whereby motor 10 is connected to battery 13, and capacitor 20 is charged from battery 13, through controlled rectifier 16.

Motor current now begins to flow, and capacitor 20 charges to apply input voltage to timing circuit 31. Thus, the timing circuit including resistor 53 and capacitor 54 begins to conduct with the unijunction transistor 55 conducting a current pulse at a time dependent upon the adjusted time constant of the R-C circuit formed by elements 53 and 54. This delivers a gate pulse to fire controlled rectifier 56 which, in turn, discharges capacitor 51 into the gate circuit of controlled rectifier 17 to fire controlled rectifier 17.

When controlled rectifier 17 is gated, charged capacitor 20 reverses the voltage across controlled rectifier 15 to stop conduction of controlled rectifier 15, thereby terminating the current pulse applied to motor 10. Note that the length of this pulse depends upon the setting of adjustable resistor 53.

During this time, capacitor 38 in timing circuit 30 has been charging and, at some predetermined time, fires transistor 39, again to gate controlled rectifiers 15 and 16. The adjusted time constant of resistor 37 and capacitor 38, therefore, determines the pulse repetition rate for pulses which are applied to motor 10.

It will be noted that the circuit described above can control output voltage to motor 10 in a constant pulse width, variable repetition rate mode, or in a constant repetition, variable pulse width mode, or in some combination of these two modes.

Several significant features should be noted concerning the operation of the novel circuit.

First, it will be seen that the various controlled rectifiers are operated without using conventional pulse transformers.

Second, there is a novel interrelation between circuits 30 and 31 which causes positive synchronization of turn-on and turn-off of controlled rectifier 15 by operating transistor 55 from the voltage on commutating capacitor 20.

The novel circuit further permits full conduction of controlled rectifier 15 simply by removing the gate pulse applied to controlled rectifier 16. This can be obtained by suitable adjustment, or opening of the R-C circuit including resistor 37 and capacitor 38, or by simply shorting the gate of controlled rectifier 17 to its cathode.

An important advantage of the circuit of the invention is that the control system can continue to operate even if the motor circuit is opened as by the opening of switch 19. Such continued operation of the control circuit is desirable for many different purposes and is unrelated to the type of motor being used. In this mode of operation, the capacitor 20 charges in the usual manner with the firing of controlled rectifiers 15 and 16. With the firing of controlled rectifier 17, capacitor 20 can now discharge through the circuit including inductor 21, diode 22 and the main electrodes of controlled rectifier 17 rather than discharging through the motor 10 when the motor is connected.

Although this invention has been described with respect to its preferred embodiments, it should be understood that many variations and modifications will now be obvious to thos skilled in the art, and it is preferred, therefore, that the scope of the invention be limited not by the specific disclosure herein, but only by the appended claims.

I claim:

1. A d-c voltage control circuit comprising, in combination:

first, second and third controlled rectifiers each having main electrodes, and a control electrode;

a source of d-c voltage, and means for connecting said first controlled rectifier main electrodes and said source of d-c voltage in series with one another and in series with a load;

a commutating capacitor; said commutating capacitor connected in closed series connection with said main electrodes of said first and second controlled rectifiers, respectively, whereby the conduction of said second controlled rectifier permits the discharge of said capacitor through said first controlled rectifier in a direction to extinguish current flow in said first controlled rectifier;

said main electrodes of said third controlled rectifier connected in closed series relation with said source of d-c voltage and said main electrodes of said first controlled rectifier, whereby conduction of said first and third controlled rectifiers causes charging of said capacitor from said source of d-c voltage; said main electrodes of said third controlled rectifier being further connected in closed series relation with said main electrodes of said second controlled rectifier and said source of d-c voltage;

first firing circuit means connected to said control electrodes of said first and third controlled rectifiers for applying firing pulses thereto having a predetermined repetition rate;

and second firing circuit means connected to said control electrode of said second controlled rectifier for applying firing pulses thereto a predetermined time after the firing of said first and third controlled rectifiers;

said load comprising a d-c load; said d-c load being connected in a closed series relation which includes only said commutating capacitor and said main electrodes of said third controlled rectifier;

and synchronizing circuit means connected between said first and second firing circuit means for insuring the presence of a firing pulse from said second firing circuit means a predetermined time after the production of a pulse by said first firing circuit means; said synchronizing circuit means including said commutating capacitor as a source of operating voltage for said second firing circuit means.

2. The control circuit of claim 1 which includes first and second independent adjustment means for said first and second firing circuits, respectively, for independently adjusting the rate of production of firing pulses thereby.

* * * * *